United States Patent
Larson et al.

(10) Patent No.: US 7,843,426 B2
(45) Date of Patent: Nov. 30, 2010

(54) ACTIVE HUMAN-MACHINE INTERFACE SYSTEM INCLUDING INTERPOSED SECTOR GEARS

(75) Inventors: Keith D. Larson, Petoskey, MI (US); Joseph M. Walling, Boyne City, MI (US); John K. Tillotson, Petoskey, MI (US)

(73) Assignee: Honeywell International Inc., Morristown, NJ (US)

( * ) Notice: Subject to any disclaimer, the term of this patent is extended or adjusted under 35 U.S.C. 154(b) by 646 days.

(21) Appl. No.: 11/860,740

(22) Filed: Sep. 25, 2007

(65) Prior Publication Data

US 2008/0111515 A1    May 15, 2008

Related U.S. Application Data

(60) Provisional application No. 60/859,791, filed on Nov. 15, 2006.

(51) Int. Cl.
*G09G 5/00* (2006.01)

(52) U.S. Cl. ........................... 345/156; 345/161

(58) Field of Classification Search ......... 345/156–157, 345/161–166; 463/36–38, 46; 434/45; 318/560–561, 318/568.11, 628
See application file for complete search history.

(56) References Cited

U.S. PATENT DOCUMENTS

| | | | |
|---|---|---|---|
| 4,857,881 A | 8/1989 | Hayes | |
| 5,900,710 A | 5/1999 | Gautier et al. | |
| 6,271,833 B1 | 8/2001 | Rosenberg et al. | |
| 6,307,486 B1 | 10/2001 | Takeda et al. | |
| 6,380,925 B1 | 4/2002 | Martin et al. | |
| 6,400,352 B1 | 6/2002 | Bruneau et al. | |
| 6,429,849 B1 * | 8/2002 | An et al. | 345/161 |
| 6,480,752 B1 * | 11/2002 | Blume et al. | 700/56 |
| 6,573,885 B1 | 6/2003 | McVicar | |
| 6,642,685 B2 | 11/2003 | Onodera | |
| 6,762,745 B1 * | 7/2004 | Braun et al. | 345/156 |
| 6,850,222 B1 | 2/2005 | Rosenberg | |
| 7,100,467 B2 * | 9/2006 | Shiomi et al. | 74/335 |

FOREIGN PATENT DOCUMENTS

DE    19621023 C1    9/1997

(Continued)

*Primary Examiner*—Richard Hjerpe
*Assistant Examiner*—Mansour M Said
(74) *Attorney, Agent, or Firm*—Ingrassia Fisher & Lorenz, P.C.

(57) ABSTRACT

A human-machine interface assembly includes a user interface, a first motor, a second motor, a first sector gear, and a second sector gear. The user interface is configured to rotate about a first rotational axis and a second rotational axis that is perpendicular to the first rotational axis. The user interface is responsive to an input force to rotate about one or both of the first and second rotational axes. The first motor is disposed apart from the first rotational axis and generates a drive force about a third rotational axis that is parallel to the first rotational axis. The second motor is disposed apart from the second rotational axis and generates a drive force about a fourth rotational axis that is parallel to the second rotational axis. The first sector gear is coupled between the first motor and the user interface, and the second sector gear is coupled between the second motor and the user interface.

15 Claims, 6 Drawing Sheets

FOREIGN PATENT DOCUMENTS

| | | |
|---|---|---|
| EP | 0079184 A1 | 5/1983 |
| EP | 1598726 A2 | 11/2005 |
| EP | 1598727 A1 | 11/2005 |
| EP | 1602550 A2 | 12/2005 |
| GB | 2367348 A | 4/2002 |
| WO | WO 2005/090830 | 9/2005 |

* cited by examiner

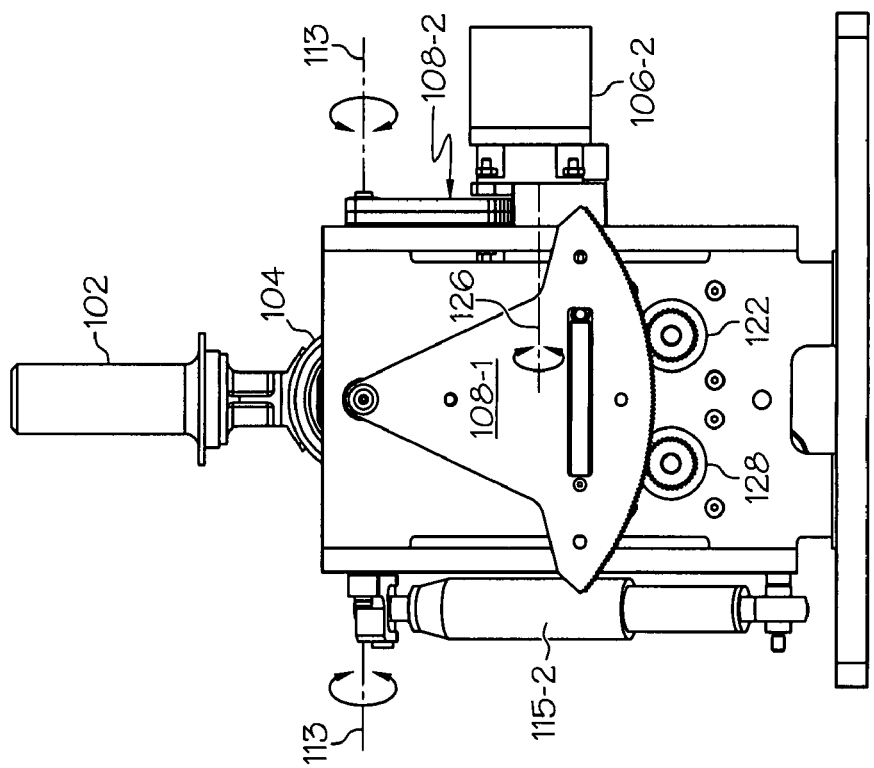
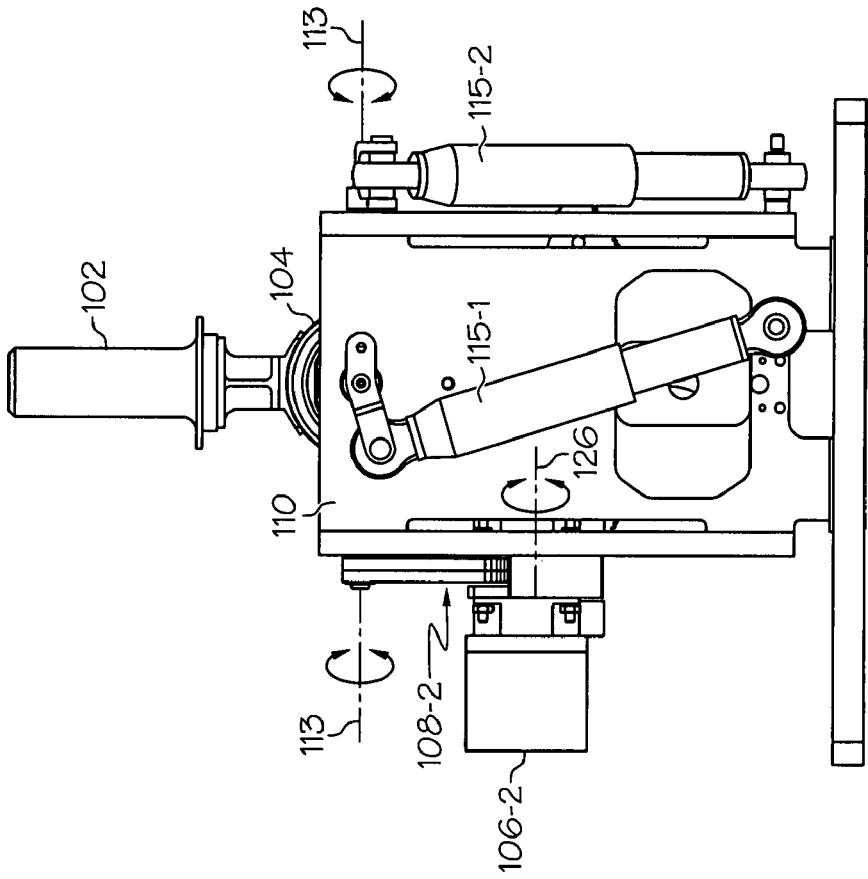
FIG. 5
FIG. 6

ACTIVE HUMAN-MACHINE INTERFACE SYSTEM INCLUDING INTERPOSED SECTOR GEARS

CROSS-REFERENCES TO RELATED APPLICATIONS

This application claims the benefit of U.S. Provisional Application No. 60/859,791, filed Nov. 15, 2006.

TECHNICAL FIELD

The present invention relates to human-machine interfaces and, more particularly, to a human-machine interface system that includes sector gears between the motors and the user interface.

BACKGROUND

Human-machine interfaces that are used to translate human movements to machine movements are used in myriad industries. For example, some aircraft flight control systems include a human-machine interface in the form of one or more control sticks. The flight control system, in response to input forces supplied to the control stick from the pilot, controls the movements of various aircraft flight control surfaces. No matter the particular end-use system, the human-machine interface preferably includes some type of haptic feedback mechanism back through the interface to the interface operator. In some implementations, the haptic feedback mechanisms are active mechanisms that include one or more electrically controlled motors that supply force feedback to the human-machine interface, typically via multiple gear stages that exhibit relatively high gear ratios.

Although useful and robust, feedback mechanisms that include multiple gear stages do exhibit certain drawbacks. For example, these gear stages, which are typically implemented using multi-stage planetary gears or harmonic drives, increase overall feedback mechanism inertia and friction, which can adversely affect overall system efficiency.

Hence, there is a need for a human-machine haptic feedback mechanism that includes one or more gear stages that exhibit less overall feedback mechanism inertia and friction, as compared to presently known systems. The present invention addresses at least this need.

BRIEF SUMMARY

In one embodiment, and by way of example only, a human-machine interface assembly includes a user interface, a first motor, a second motor, a first sector gear, and a second sector gear. The user interface is configured to rotate, from a null position, in first and second directions about a first rotational axis and in first and second directions about a second rotational axis. The second rotational axis is perpendicular to the first rotational axis. The user interface is adapted to receive an input force and, in response to the input force, to rotate, from the null position to a control position, about one or both of the first and second rotational axes. The first motor is disposed apart from the first rotational axis and is configured, upon being energized, to generate a drive force about a third rotational axis that is parallel to the first rotational axis. The second motor is disposed apart from the second rotational axis and is configured, upon being energized, to generate a drive force about a fourth rotational axis that is parallel to the second rotational axis. The first sector gear is coupled between the first motor and the user interface, to thereby transfer the drive force generated by the first motor to the user interface. The second sector gear is coupled between the second motor and the user interface, to thereby transfer the drive force generated by the second motor to the user interface.

In another exemplary embodiment, an active human-machine interface system includes a user interface, a first motor, a second motor, a first pair of sector gears, a second pair of sector gears, a first spring, and a second spring. The user interface is configured to rotate, from a null position, in first and second directions about a first rotational axis and in first and second directions about a second rotational axis. The second rotational axis is perpendicular to the first rotational axis. The user interface is adapted to receive an input force and, in response to the input force, to rotate, from the null position to a control position, about one or both of the first and second rotational axes. The first motor is configured, upon being energized, to generate a drive force. The second motor is configured, upon being energized, to generate a drive force. The first pair of sector gears is coupled between the first motor and the user interface to thereby transfer the drive force generated by the first motor to the user interface. The second pair of sector gears is coupled between the second motor and the user interface to thereby transfer the drive force generated by the second motor to the user interface. The first spring is coupled between the first pair of sector gears, and the second spring is coupled between the second pair of sector gears.

In yet another exemplary embodiment, a human-machine interface assembly includes a user interface, a first motor, a second motor, a first pair of sector gears, and a second pair of sector gears. The user interface is configured to rotate, from a null position, in first and second directions about a first rotational axis and in first and second directions about a second rotational axis. The second rotational axis is perpendicular to the first rotational axis. The user interface is adapted to receive an input force and, in response to the input force, to rotate, from the null position to a control position, about one or both of the first and second rotational axes. The first motor is disposed apart from the first rotational axis and is configured, upon being energized, to generate a drive force about a third rotational axis that is parallel to the first rotational axis. The second motor is disposed apart from the second rotational axis and is configured, upon being energized, to generate a drive force about a fourth rotational axis that is parallel to the second rotational axis. The first pair of sector gears is coupled between the first motor and the user interface, to thereby transfer the drive force generated by the first motor to the user interface. The second pair of sector gears is coupled between the second motor and the user interface, to thereby transfer the drive force generated by the second motor to the user interface. The first and second rotational axes are each disposed in a first plane, the third rotational axis is disposed in a second plane that is displaced from the first plane, and the fourth rotational axis is disposed in a third plane that is displaced from the first and second planes.

BRIEF DESCRIPTION OF THE DRAWINGS

The present invention will hereinafter be described in conjunction with the following drawing figures, wherein like numerals denote like elements, and wherein:

FIGS. 1-6 are top, bottom, front end, back end, left side, and right side views of an active human-machine interface assembly in accordance with an exemplary embodiment of the present invention;

DETAILED DESCRIPTION OF A PREFERRED EMBODIMENT

Figure 1:
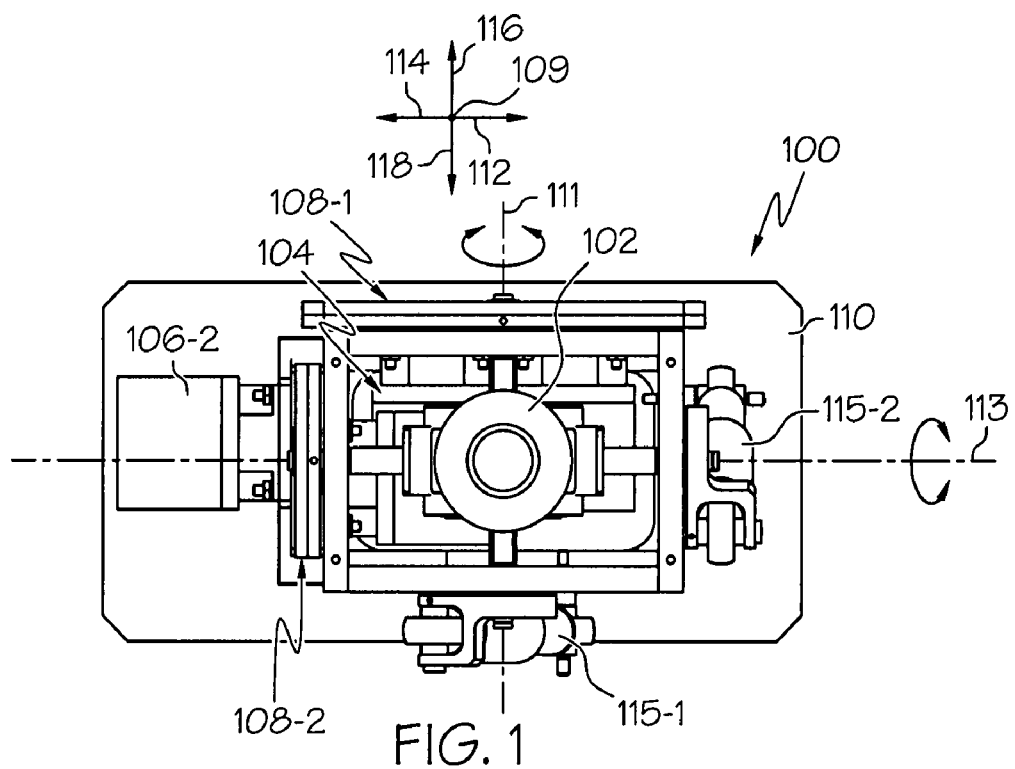
Figure 2:
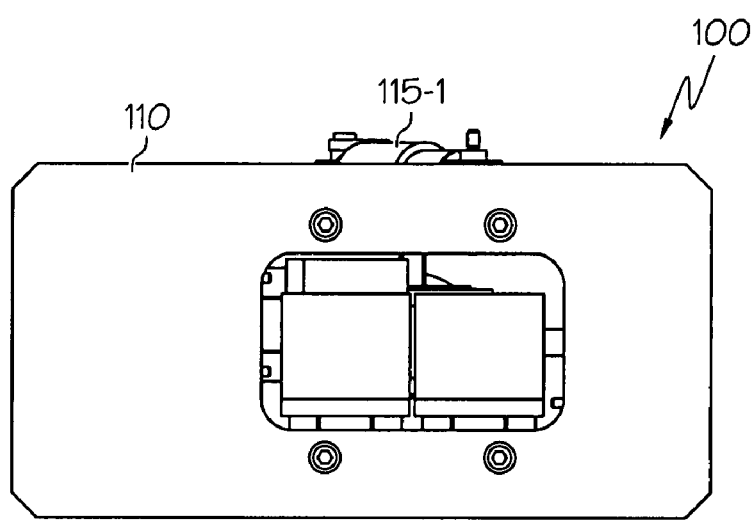
Figure 4:
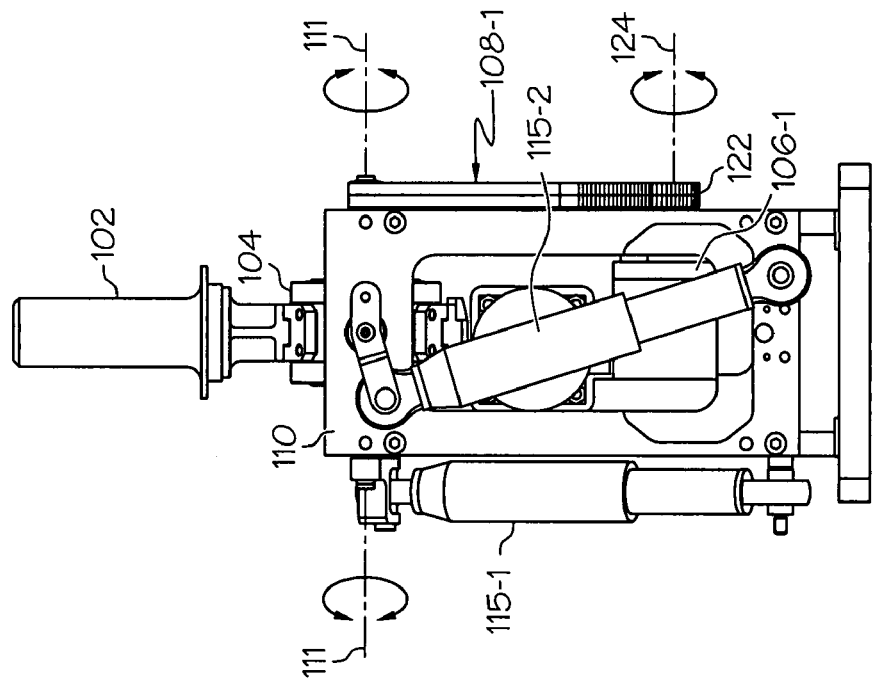
Figure 3:
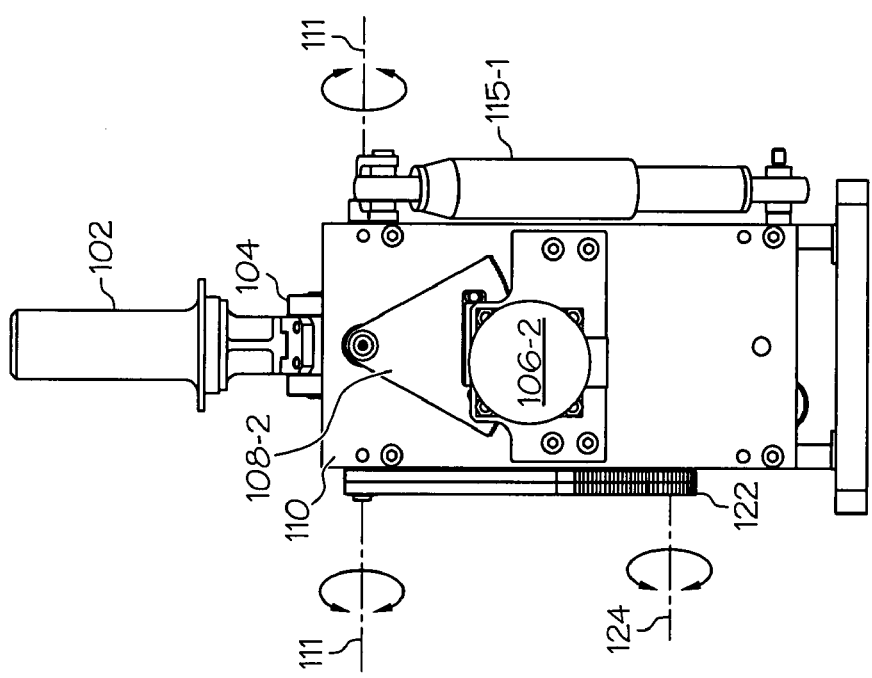

The following detailed description is merely exemplary in nature and is not intended to limit the invention or the application and uses of the invention. Furthermore, there is no intention to be bound by any theory presented in the preceding background or the following detailed description. In this regard, although the following description is, for convenience, directed to a system implemented with a user interface that is configured as a control stick, it will be appreciated that the system could be implemented with variously configured user interfaces including, for example, variously configured pedals, yokes, levers, and the like.

An exemplary embodiment of an active human-machine interface control unit 100 is depicted in FIGS. 1-6, and includes a user interface 102, a gimbal assembly 104, a plurality of motors 106 (e.g., 106-1, 106-2), and a plurality of sector gears 108 (e.g., 108-1, 108-2). The user interface 102 is coupled to the gimbal assembly 104 and is configured to receive an input force from a user. The user interface 102 may be implemented according to any one of numerous configurations. In the depicted embodiment, however, it is implemented as a control stick that is preferably dimensioned to be grasped by a hand.

The gimbal assembly 104 is mounted within a housing assembly 110 and is configured to allow the user interface 102 to be moved from a null position 109, which is the position depicted in FIGS. 1-6, to a control position in a plurality of directions. More specifically, the gimbal assembly 104, in response to an input force supplied to the user interface 102, is movable from the null position 109 to a control position, about two perpendicular rotational axes—a first rotational axis 111 and a second rotational axis 113. It will be appreciated that if the active human-machine interface control unit 100 is implemented as an aircraft flight control human-machine interface, such as a pilot (or co-pilot) inceptor, then the first and second rotational axes 111, 113 may be referred to as the pitch axis and the roll axis, respectively. No matter its specific end use, the gimbal assembly 104 allows the user interface 102 to be movable about the first axis 111 in a forward direction 112 and an aft direction 114, and is movable about the second axis 113 in a port direction 116 and a starboard direction 118. It will additionally be appreciated that the gimbal assembly 104 is configured to allow the user interface 102 to be simultaneously rotated about the first and second rotational axes 111, 113 to move the user interface 102 in a combined forward-port direction, a combined forward-starboard direction, a combined aft-port direction, or a combined aft-starboard direction, and back to or through the null position 109. The gimbal assembly 104 may be constructed in accordance with any one of numerous configurations now known or developed in the future. A description of the gimbal assembly 104 is not needed to fully enable or describe the invention, and will thus not be provided.

The motors 106, which in the depicted embodiment include a first motor 106-1 and a second motor 106-2, are also mounted on the housing 110, apart from the first and second rotational axes 111, 113, and are used to supply force feedback to the user interface 102 The first motor 106-1 is controllably energized to supply force feedback to the user interface 102 in opposition to user interface displacements having a vector component in either the forward or backward direction 112, 114, and the second motor 106-2 is controllably energized to supply force feedback to the user interface 102 in opposition to user interface displacements having a vector component in either the left or right direction 116, 118. The motors 106 are controllably energized from feedback control circuits (not depicted in FIGS. 1-6) that receive a signal from one or more non-illustrated position sensors and, in response to at least these signals, controllably energize the motors 106 to supply the appropriate force feedback to the user interface 102. The motors 106 may be implemented using any one of numerous types of motors, but in the depicted embodiment are cogless brushless motors.

As was just noted, the motors 106 are disposed apart from the first and second rotational axes 111, 113. It may thus be appreciated that the motors 106, when energized, generate drive forces about rotational axes that are parallel to, and spaced apart from, the first and second rotational axes 111, 113. More specifically, and as shown most clearly in FIGS. 3 and 4, the first motor 106-1, when energized, generates a drive force about a third rotational axis 124 that is parallel to the first rotational axis 111. As shown more clearly in FIGS. 5 and 6, the second motor 106-2, when energized, generates a drive force about a fourth rotational axis 126 that is parallel to the second rotational axis 113. As FIGS. 3-6 illustrates, the first and second rotational axes 111, 113 are coplanar, and are each disposed in a first plane. The third and fourth rotational axes are, however, not coplanar with each other or with the first and second rotational axes. Instead, the third rotational axis 124 is disposed in a second plane, and the fourth rotational axis 126 is disposed in a third plane. The second plane and the third plane are displaced from each other, and are both displaced from the first plane.

Before proceeding further, it is noted that the control unit 100, at least in the depicted embodiment, further includes a plurality of electrically controllable dampers 115. The electrically controllable dampers 115, which in the depicted embodiment include a first damper 115-1 and a second damper 115-2, are mounted on the housing 110 and are used to selectively supply force feedback to the user interface 102. The dampers 115 are also each coupled to the user interface 102 via the gimbal assembly 104, with the first damper 115-1 configured to selectively supply force feedback to the user interface 102 in opposition to user interface displacements having a vector component in either the forward or backward direction 112, 114, and the second damper 115-2 is configured to selectively supply force feedback to the user interface 102 in opposition to user interface displacements having a vector component in either the left or right direction 116, 118. The dampers 115 may be constructed in accordance with any one of numerous configurations now known or developed in the future. A description of the dampers 115 is not needed to fully enable or describe the invention, and will thus not be provided.

Continuing now with the description, it may be seen that the drive force generated by the motors 106 is transferred to the user interface 102 via the sector gears 108 and the gimbal assembly 104. More specifically, and at least in the depicted embodiment, the first motor 106-1 includes a splined output shaft 122 that meshes with a first sector gear 108-1 (see FIGS. 3, 4, and 6). The first sector gear 108-1 is in turn coupled to the gimbal assembly 104, to thereby transfer the drive force generated by the first motor 106-1 to the user interface 102. Similarly, although not visible in FIGS. 1-6, the second motor 106-1 includes a splined output shaft that meshes with a second sector gear 108-2. The second sector gear 108-2 is also coupled to the gimbal assembly 104, to thereby transfer the drive force generated by the second motor 106-2 to the user interface 102.

The first and second sector gears 108-1, 108-2 are each configured to supply an appropriate, and preferably equivalent, gear reduction between the first and second motors 106-1, 106-2, respectively, and the user interface 102. In some embodiments an anti-backlash gear 128 may also be included with each sector gear 108-1, 108-2 (only one depicted in FIG. 6). In another embodiment, which will now be described in more detail, the sector gears 108-1, 108-2 are configured to provide anti-backlash functionality.

Figure 7:
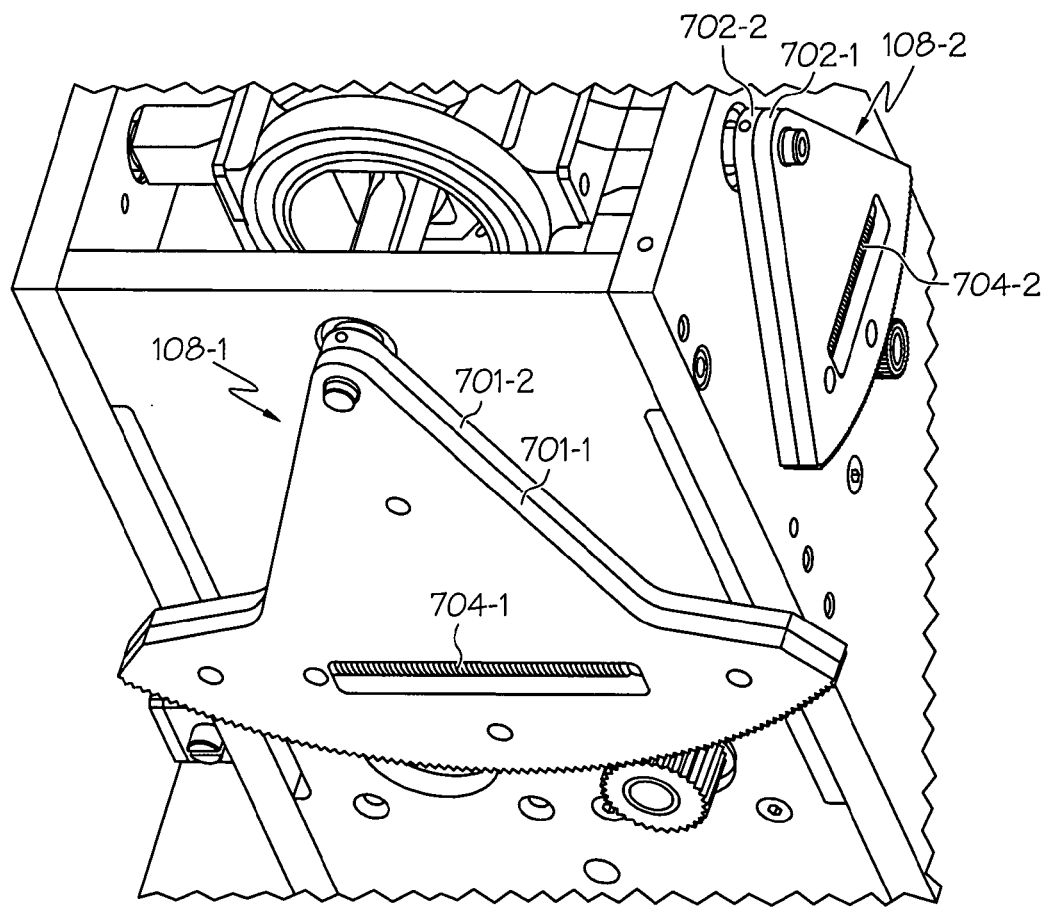
FIG. 7 is a perspective view of a portion of the assembly depicted in FIG. 1.

More specifically, and with reference now to FIG. 7, it is seen that in a particular preferred embodiment the sector gears 108 each include a pair of sector gears. In particular, the first sector gear 108-1 includes a first pair of sector gears 701-1, 701-2, and the second sector gear 108-2 includes a second pair of sector gears 702-1, 702-2. As FIG. 7 further depicts, a first spring 704-1 is coupled between the first pair of sector gears 701-1, 701-2, and a second spring 704-2 is coupled between the second pair of sector gears 702-1, 702-2. The first spring 704-1 pulls the first pair of sector gears 701-1, 701-2 together, in opposite directions, and second spring 704-2 pulls the second pair of sector gears 702-1, 702-2 together, in opposite directions, thereby implementing the anti-backlash functionality. Specific configurations of the first 701-1, 701-2 and second 702-1, 702-2 pairs of sector gears, which provide for the accommodation of the first and second springs 704-1, 704-2, are depicted in FIGS. 8A, 8B, 9A, and 9B and will now be described.

Figure 8A:
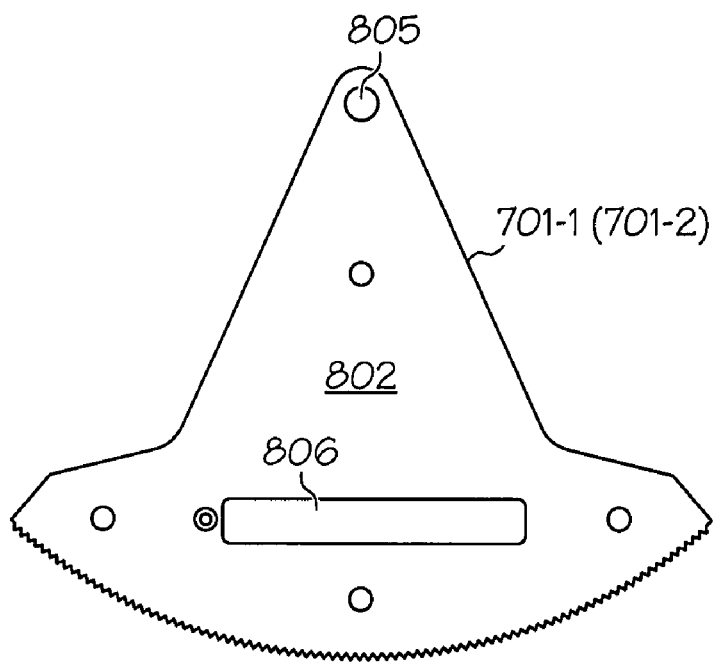
FIGS. 8A and 8B are front side and back side views of a sector gear that may be used in the assembly depicted in FIG. 1.
Figure 8B:
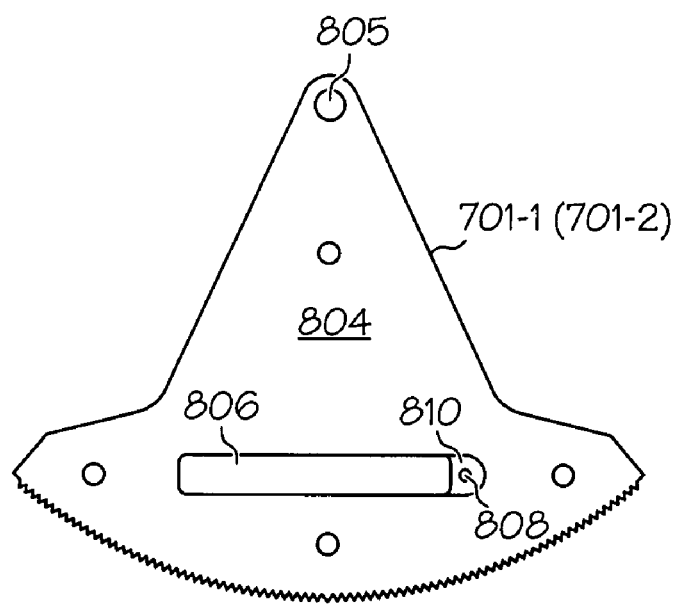

With reference first to FIGS. 8A and 8B, it is seen that each of the first pair of sector gears 701-1, 701-2 includes a first side 802, a second side 804, a gimbal connection opening 805, a spring opening 806, and a spring coupling extension 808. The spring opening 806 extends through each of the first pair of sector gears 701, between the first and second sides 802, 804. The gimbal opening 805 is used to couple the each sector gear 701-1, 701-2 to the gimbal assembly 104. A pocket 810 is formed adjacent the spring opening 806 on the second side 804. The spring coupling extension 808 is disposed within the pocket 810, and is configured to allow one end of the first spring 704-1 to be coupled thereto.

Figure 9A:
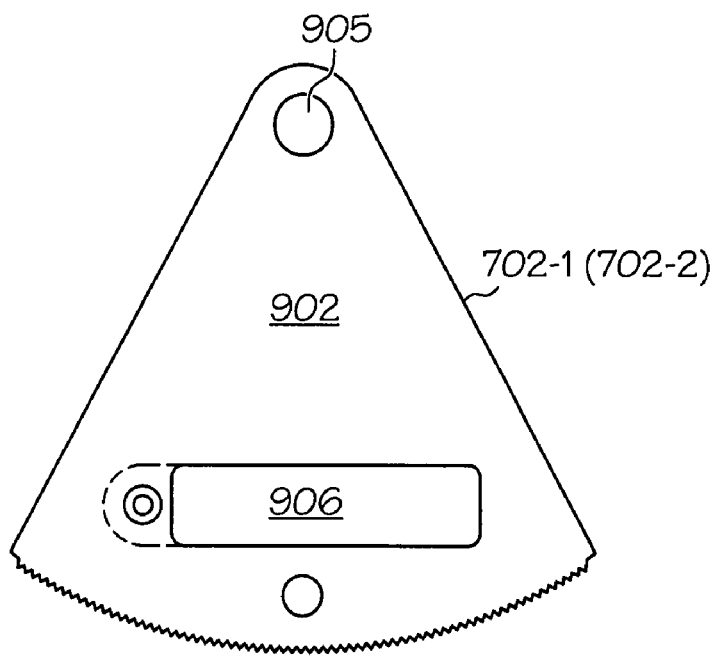
FIGS. 9A and 9B are front side and back side views of another sector gear that may be used in the control unit depicted in FIG. 1.
Figure 9B:
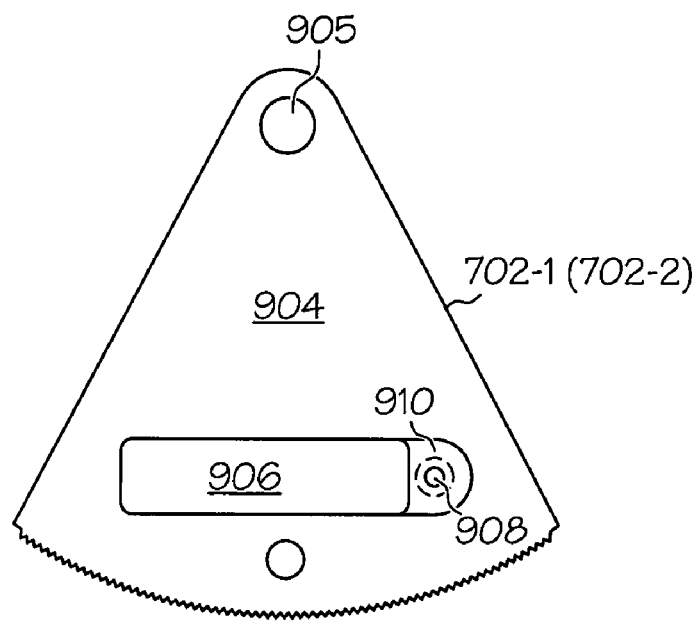

Turning now to FIGS. 9A and 9B, it is seen that each of the second pair of sector gears 702-1, 702-2 similarly includes at least a first side 902, a second side 904, a gimbal opening 905, a spring opening 906, and a spring coupling extension 908. The gimbal opening 905 is used to couple the each sector gear 701-1, 701-2 to the gimbal assembly 104. The spring opening 906 extends through each of the second pair of sector gears 702, between the first and second sides 902, 904. A pocket 910 is formed adjacent the spring opening 906 on the second side 904. The spring coupling extension 908 is disposed within the pocket 910, and is configured to allow one end of the second spring 704-2 to be coupled thereto.

With the above-described configurations, and with reference returned once again to FIG. 7, it may be seen that the first pair of sector gears 701-1, 701-2 are preferably disposed such that their second sides 804 are adjacent each other, and the second pair of sector gears 702-1, 702-2 are preferably disposed such that their second sides 904 are adjacent each other. When disposed in this manner, the spring coupling extensions 808 and pockets 810 of each of the first pair of sector gears 701-1, 701-2 are oppositely disposed, and the spring coupling extensions 808 extend at least partially into the other sector gear spring opening 806. In a similar manner, the spring coupling extensions 908 and pockets 910 of each of the second pair of sector gears 702-1, 702-2 are oppositely disposed, and the spring coupling extensions 908 extend at least partially into the other sector gear spring opening 906.

The first and second sector gears 108-1, 108-2 provide a given force from the first and second motors 106-1, 106-2, respectively, to the user interface 102. Using the force requirements and the angular displacement of the user interface 102 about the first and second rotational axes 111, 113, the gear ratios are calculated to provide the desired system response. With the calculated ratios, the gear tooth pitch of each sector gear 108-1, 108-2 is selected to adjust the pitch diameter which allows the motors 106-1, 106-2 to be placed parallel to the first and second rotational axes 111, 113 in a radial arc, which controls the total required number of sector gear teeth and angular geometry. The sector gear geometry in one axis may be modified to allow two gears to overlap in their respective operational arcs.

The use of sector gears allows for a high degree of gear ratio while maintaining minimal envelope requirements. With the higher achievable gear ratio, this eliminates the need for multiple gear stages, which improves hand feel and system inertia in an active feedback control unit. With the single stage sector gears replacing a multiple stage, planetary gear or harmonic drive, the "gear box" friction and overall system inertia are reduced allowing for a more efficient system.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention.

What is claimed is:

1. A human-machine interface assembly, comprising:
   a user interface configured to rotate, from a null position, in first and second directions about a first rotational axis and in first and second directions about a second rotational axis, the second rotational axis perpendicular to the first rotational axis, the user interface configured to receive an input force and, in response to the input force, to rotate, from the null position to a control position, about one or both of the first and second rotational axes;
   a first motor disposed apart from the first rotational axis and configured, upon being energized, to generate a drive force about a third rotational axis, the third rotational axis parallel to the first rotational axis;
   a second motor disposed apart from the second rotational axis and configured, upon being energized, to generate a drive force about a fourth rotational axis, the fourth rotational axis parallel to the second rotational axis;
   a first sector gear coupled between the first motor and the user interface, to thereby transfer the drive force generated by the first motor to the user interface; and
   a second sector gear coupled between the second motor and the user interface, to thereby transfer the drive force generated by the second motor to the user interface.

2. The assembly of claim 1, wherein:
   the first sector gear comprises a first pair of sector gears; and
   the second sector gear comprises a second pair of sector gears.

3. The assembly of 2, further comprising:
a first spring coupled between the first pair of sector gears; and
a second spring coupled between the second pair of sector gears.

4. The assembly of claim 1, wherein:
the first and second rotational axes are each disposed in a first plane;
the third rotational axis is disposed in a second plane that is displaced from the first plane; and
the fourth rotational axis is disposed in a third plane that is displaced from the first and second planes.

5. The assembly of claim 1, wherein:
the first rotational axis and the third rotational axis are displaced from each other by a first distance;
the second and fourth rotational axes are displaced from each other by a second distance; and
the first distance is greater than the second distance.

6. The assembly of claim 1, wherein the first and second sector gears each supply at least substantially equivalent gear reduction between the first and second motors, respectively, and the user interface.

7. An active human-machine interface system, comprising:
a user interface configured to rotate, from a null position, in first and second directions about a first rotational axis and in first and second directions about a second rotational axis, the second rotational axis perpendicular to the first rotational axis, the user interface configured to receive an input force and, in response to the input force, to rotate, from the null position to a control position, about one or both of the first and second rotational axes;
a first motor configured, upon being energized, to generate a drive force;
a second motor configured, upon being energized, to generate a drive force;
a first pair of sector gears coupled between the first motor and the user interface to thereby transfer the drive force generated by the first motor to the user interface;
a second pair of sector gears coupled between the second motor and the user interface to thereby transfer the drive force generated by the second motor to the user interface;
a first spring coupled between the first pair of sector gears; and
a second spring coupled between the second pair of sector gears.

8. The assembly of claim 7, wherein:
the first motor is disposed apart from the first rotational axis and, when energized, generates a drive force about a third rotational axis, the third rotational axis parallel to the first rotational axis; and
the second motor is disposed apart from the second rotational axis and, when energized, generates a drive force about a fourth rotational axis, the fourth rotational axis parallel to the second rotational axis.

9. The assembly of claim 8, wherein:
the first and second rotational axes are each disposed in a first plane;
the third rotational axis is disposed in a second plane that is displaced from the first plane; and
the fourth rotational axis is disposed in a third plane that is displaced from the first and second planes.

10. The assembly of claim 8, wherein:
the first rotational axis and the third rotational axis are displaced from each other by a first distance;
the second and fourth rotational axes are displaced from each other by a second distance; and
the first distance is greater than the second distance.

11. The assembly of claim 7, wherein the first and second sector gears each supply at least substantially equivalent gear reduction between the first and second motors, respectively, and the user interface.

12. A human-machine interface assembly, comprising:
a user interface configured to rotate, from a null position, in first and second directions about a first rotational axis and in first and second directions about a second rotational axis, the second rotational axis perpendicular to the first rotational axis, the user interface configured to receive an input force and, in response to the input force, to rotate, from the null position to a control position, about one or both of the first and second rotational axes;
a first motor disposed apart from the first rotational axis and configured, upon being energized, to generate a drive force about a third rotational axis, the third rotational axis parallel to the first rotational axis;
a second motor disposed apart from the second rotational axis and configured, upon being energized, to generate a drive force about a fourth rotational axis, the fourth rotational axis parallel to the second rotational axis;
a first pair of sector gears coupled between the first motor and the user interface, to thereby transfer the drive force generated by the first motor to the user interface; and
a second pair of sector gears coupled between the second motor and the user interface, to thereby transfer the drive force generated by the second motor to the user interface,
wherein:
the first and second rotational axes are each disposed in a first plane;
the third rotational axis is disposed in a second plane that is displaced from the first plane, and
the fourth rotational axis is disposed in a third plane that is displaced from the first and second planes.

13. The assembly of 12, further comprising:
a first spring coupled between the first pair of sector gears; and
a second spring coupled between the second pair of sector gears.

14. The assembly of claim 12, wherein:
the first rotational axis and the third rotational axis are displaced from each other by a first distance;
the second and fourth rotational axes are displaced from each other by a second distance; and
the first distance is greater than the second distance.

15. The assembly of claim 12, wherein the first and second sector gears each supply at least substantially equivalent gear reduction between the first and second motors, respectively, and the user interface.

* * * * *